(12) United States Patent
Higashino et al.

(10) Patent No.: US 9,654,278 B2
(45) Date of Patent: May 16, 2017

(54) DATA PROCESSING DEVICE, DATA PROCESSING METHOD, AND RECOVERY DEVICE

(71) Applicant: Sony Corporation, Tokyo (JP)

(72) Inventors: Satoru Higashino, Tokyo (JP); Junya Shiraishi, Nagano (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/589,187

(22) Filed: Jan. 5, 2015

(65) Prior Publication Data

US 2015/0207615 A1 Jul. 23, 2015

(30) Foreign Application Priority Data

Jan. 22, 2014 (JP) .................. 2014-009735

(51) Int. Cl.
*H04L 7/00* (2006.01)
*G11B 20/10* (2006.01)

(52) U.S. Cl.
CPC ........ *H04L 7/0029* (2013.01); *G11B 20/1024* (2013.01); *G11B 20/1025* (2013.01); *G11B 20/10222* (2013.01)

(58) Field of Classification Search
CPC . H03L 7/0814; H03L 7/091; H04L 25/03006; H04L 25/03885; H04L 7/0025; H04L 7/0029; G11B 20/10222

USPC ......................... 375/354, 285, 355
See application file for complete search history.

(56) References Cited

U.S. PATENT DOCUMENTS

| | | | | |
|---|---|---|---|---|
| 5,917,869 A | * | 6/1999 | Larsson | H03L 7/091 375/326 |
| 6,487,672 B1 | * | 11/2002 | Byrne | G11B 20/10009 360/51 |
| 8,780,470 B1 | * | 7/2014 | Wang et al. | 360/26 |
| 2006/0256896 A1 | * | 11/2006 | Venkataramani et al. | 375/341 |
| 2007/0279784 A1 | * | 12/2007 | Yamamoto | G11B 20/10009 360/40 |
| 2010/0293215 A1 | * | 11/2010 | Szajnowski | G01S 13/34 708/440 |

FOREIGN PATENT DOCUMENTS

JP 2009-171247 A 7/2009
WO WO 2006-019073 A1 2/2006

* cited by examiner

*Primary Examiner* — Leila Malek
(74) *Attorney, Agent, or Firm* — Wolf, Greenfield & Sacks, P.C.

(57) ABSTRACT

A data processing device includes a signal processing unit that performs timing recovery of sampling timing, in such a manner that a sampled value is obtained at sampling timing which is set as a target by phase interpolation processing according to a feed-forward control, with respect to sampling data which is obtained from a recovery signal.

7 Claims, 10 Drawing Sheets

DATA PROCESSING DEVICE, DATA PROCESSING METHOD, AND RECOVERY DEVICE

CROSS REFERENCE TO RELATED APPLICATIONS

This application claims the benefit of Japanese Priority Patent Application JP 2014-009735 filed Jan. 22, 2014, the entire contents of which are incorporated herein by reference.

BACKGROUND

The present disclosure relates to a data processing device, a data processing method, and a recovery device that perform timing recovery with respect to sampling data which is obtained from a recovery signal. When digital data that is recorded in a recording medium such as a magnetic disc or an optical disc is recovered, a signal waveform of a recovery signal that is read out from the recording medium is sampled, the sampled value is converted into data (sampling data), and thereby recorded data is recovered. In this case, in order to recover the data at original sampling timing, a method for performing timing recovery on a recovery side using a phase looked loop (PLL) circuit is used. As described in, for example, Japanese Unexamined Patent Application Publication No. 2009-171247, as the PLL circuit in this case, two types are generally used. Firstly, a method for performing a variable control of sampling timing of an A/D converter that samples a signal waveform of a recovery signal using a voltage controlled oscillator (VCO) is used. Secondly, a so-called interpolated timing recovery (ITR) method is used. In the ITR method, a signal waveform of a recovery signal is sampled by a fixed reference clock, and timing recovery is performed by performing interpolation processing according to a phase error detection result using an interpolator (phase interpolator), with respect to the obtained sampling data.

SUMMARY

It is difficult to obtain a correct phase error in a method for using a PLL circuit, when inter symbol interference (ISI) becomes great. For this reason, particularly, in an optical disc with high density such as a Blu-ray Disc (BD: registered trademark) exceeding 50 GB, it is difficult to lock the PLL circuit, and to perform correct timing recovery.

It is desirable that a data processing device, a data processing method, and a recovery device which can improve accuracy of timing recovery with respect to sampling data be provided.

A data processing device according to an embodiment of the present disclosure includes a signal processing unit that performs timing recovery of sampling timing, in such a manner that a sampled value is obtained at sampling timing which is set as a target by phase interpolation processing according to a feed-forward control, with respect to sampling data which is obtained from a recovery signal.

A data processing method according to another embodiment of the present disclosure includes performing timing recovery of sampling timing, in such a manner that a sampled value is obtained at sampling timing which is set as a target by phase interpolation processing according to a feed-forward control, with respect to sampling data which is obtained from a recovery signal.

A recovery device according to still another embodiment of the present disclosure includes a signal generation unit that reads out a signal which is recorded in a recording medium and generates a recovery signal; and a signal processing unit that performs timing recovery of sampling timing, in such a manner that a sampled value is obtained at sampling timing which is set as a target by phase interpolation processing according to a feed-forward control, with respect to sampling data which is obtained from the recovery signal.

In the data processing device, the data processing method, and the recovery device according to the embodiments of the present disclosure, phase interpolation processing is performed by a feed-forward control, with respect to sampling data that is obtained from a recovery signal, and thereby timing recovery of sampling timing is performed.

According to the data processing device, the data processing method, and the recovery device according to an embodiment of the present disclosure, timing recovery of sampling timing is performed by performing phase interpolation processing according to a feed-forward control with respect to sampling data, and thus it is possible to improve accuracy of the timing recovery with respect to the sampling data.

In addition, the effects described herein are not limited thereto, and may include the effects described in the disclosure.

DETAILED DESCRIPTION OF EMBODIMENTS

Figure 6:
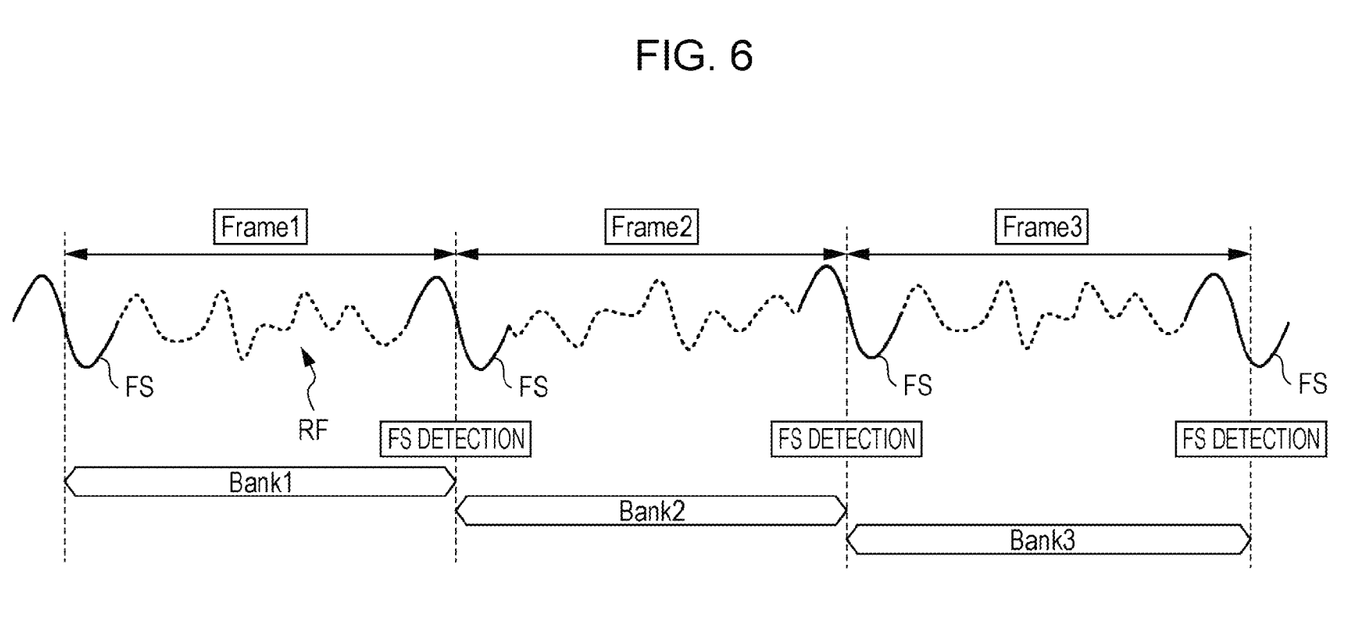
FIG. 6 is an explanatory diagram illustrating an example of a correspondence relationship between the recovery signal and the memory sequence of the buffer memory.
Figure 7:
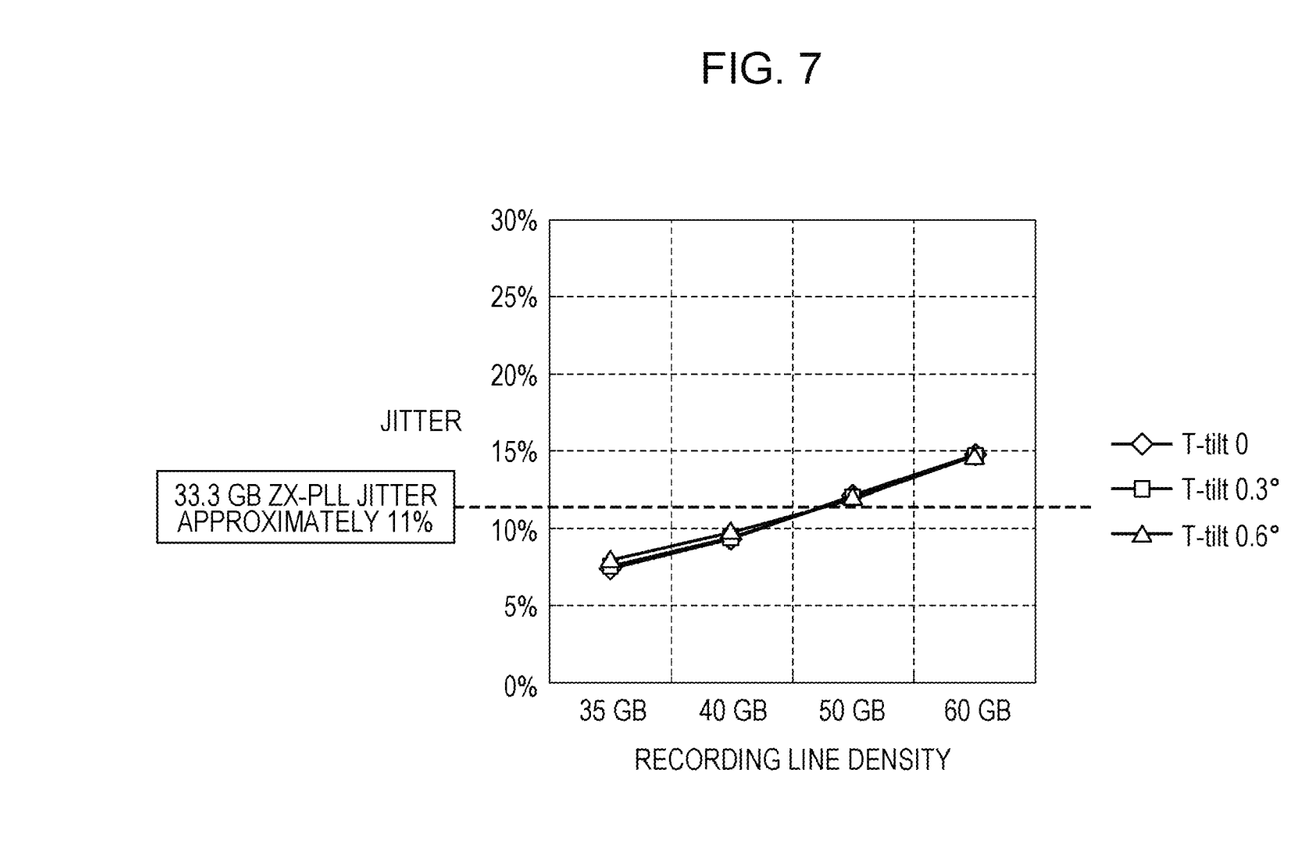
FIG. 7 is a characteristic diagram illustrating a relationship between recording line density and jitter.
Figure 8:
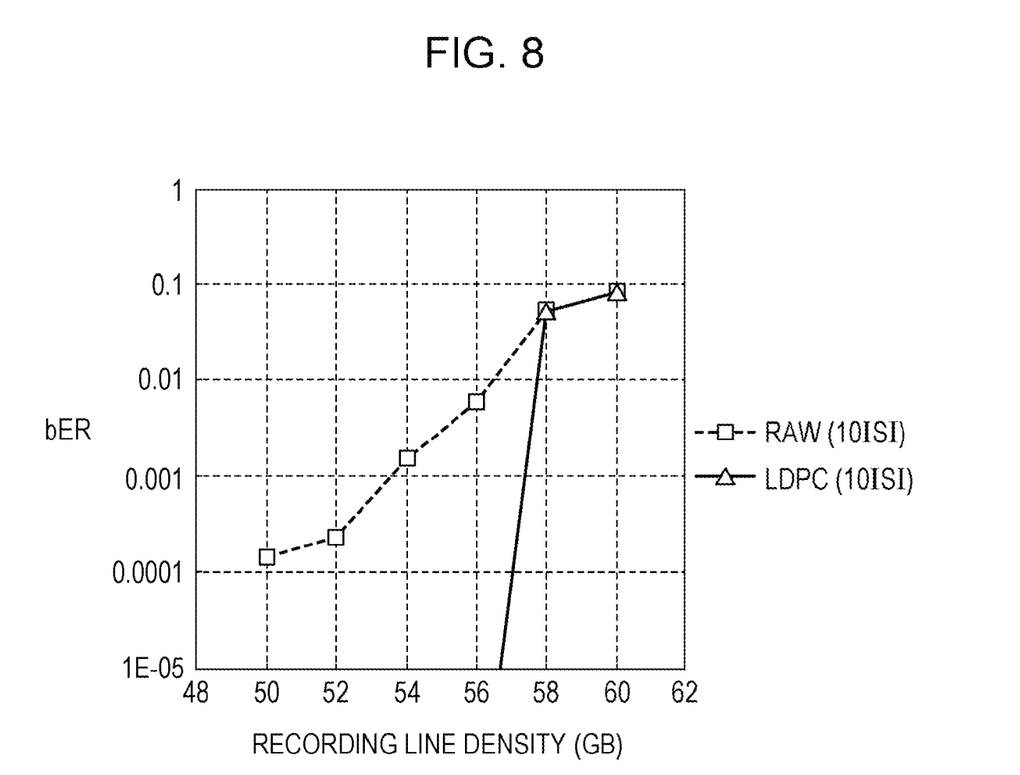
FIG. 8 is a characteristic diagram illustrating a relationship between recording line density and a bit error rate.

Hereinafter, an embodiment according to the present disclosure will be described in detail with reference to the drawings. In addition, description will be performed in the following sequence.
1. Entire Configuration and Operation of Recovery Device (FIG. 1)
2. Configuration and Operation of Data Signal Processing Unit (FIG. 2 to FIG. 6)
3. Experimental Results (FIG. 7 and FIG. 8)

4. Effects
5. Other Embodiments

1. Entire Configuration and Operation of Recovery Device

Figure 1:
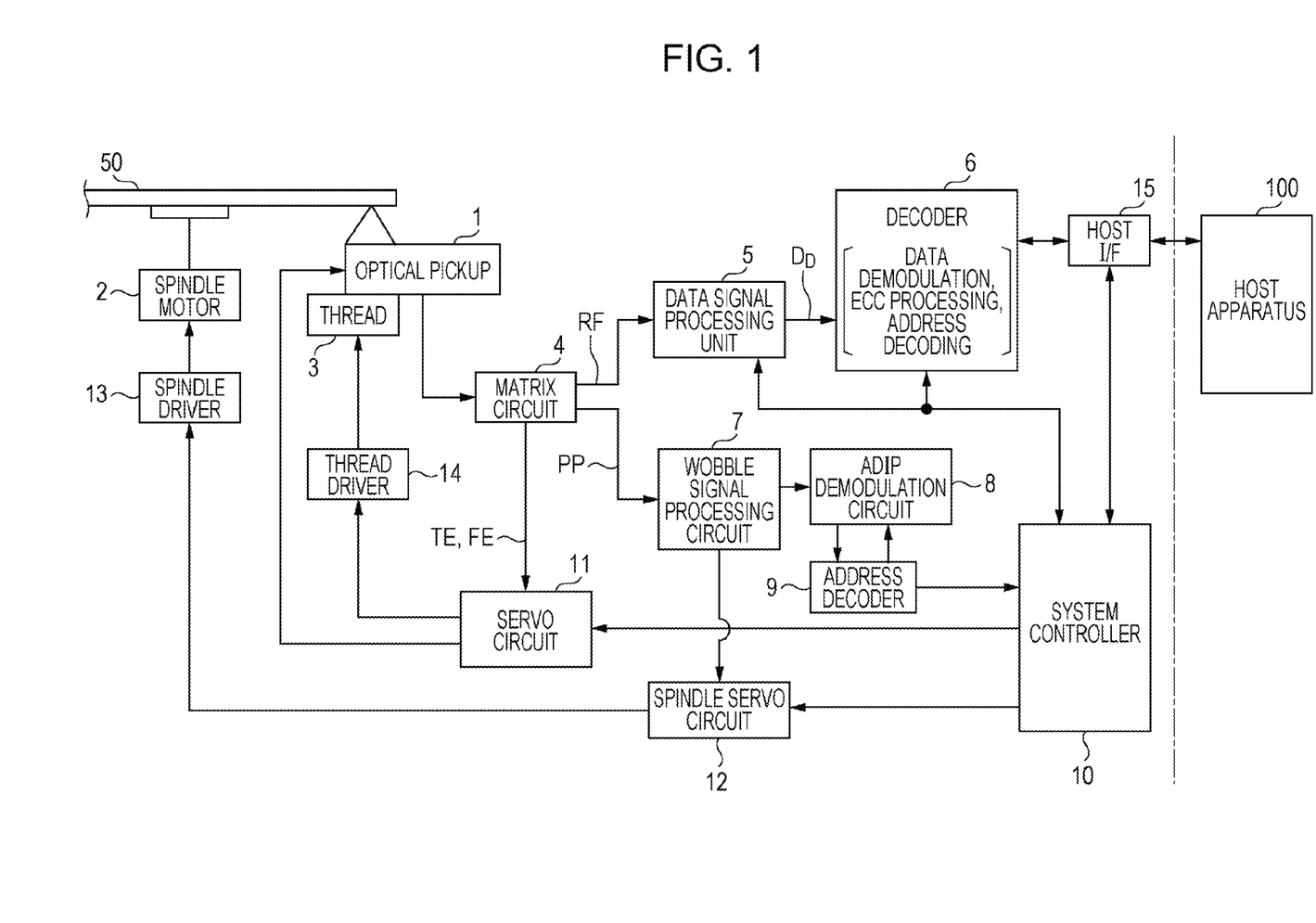
FIG. 1 is a block diagram illustrating a configuration example of a recovery device according to an embodiment of the present disclosure.

FIG. 1 illustrates a configuration example of a recovery device according to an embodiment of the present disclosure. FIG. 1 illustrates a configuration of a disc drive device that recovers data which is recorded in an optical disc 50 such as a BD, as an example of the recovery device. In addition, FIG. 1 exemplifies a case where the disc drive device is configured by a recovery only device that can perform only data recovery. As the recoverable optical disc 50, not only a recovery only ROM disc in which pits and lands are combined and data is recorded, but also an optical disc 50 of a write-once type or a rewritable type as a recordable type may be applicable. That is, in the case of a BD, the BD-R (write-once type), the BD-RE (rewritable type), or the like is applicable.

The disc drive device includes an optical pickup 1, a spindle motor 2, a thread mechanism 3, a matrix circuit 4, a data signal processing unit 5, a decoder 6, a wobble signal processing circuit 7, an ADIP demodulation circuit 8, and an address decoder 9. The disc drive device also includes a system controller 10, a servo circuit 11, a spindle servo circuit 12, a spindle driver 13, a thread driver 14, and a host interface (I/F) 15.

The optical disc 50 is placed on a turntable that is not illustrated if it is loaded to the disc drive device, and is rotationally driven by the spindle motor 2 at a constant linear velocity (CLV). At the time of recovery, read-out of a signal that is recorded on a track of the optical disc 50 as a pit or a mark is performed by the optical pickup (optical head) 1. In addition, recovery only management information such as physical information of a disc is recorded on the optical disc 50 as an emboss pit or a wobbling groove, but read-out of such information is also performed by the optical pickup 1. Furthermore, address in pregroove (ADIP) information that is embedded as wobbling of a groove track is recorded in the optical disc 50 of a recordable type, but read-out of the information can also be performed by the optical pickup 1.

A laser diode (not illustrated) that configures a laser light source or a photodetector (not illustrated) for detecting reflected light is disposed in the optical pickup 1. In addition, in the optical pickup 1, an objective lens through which laser light is output, an optical system that emits laser light to a disc recording surface via the objective lens and guides the reflected light to the photodetector, or the like is formed. The laser diode in the optical pickup 1 can output laser light with a wavelength $\lambda$ of, for example, 405 nm. In the optical pickup 1, the objective lens is retained so as to be able to be moved in a tracking direction and a focus direction by a two-axis mechanism. In addition, a spherical aberration correction mechanism is included in the optical pickup 1, so as to be able to correspond to the optical disc 50 such as the BD. The entire optical pickup 1 can be moved in a radial direction of the disc by the thread mechanism 3.

Information on the reflected light from the optical disc 50 is detected by the photodetector in the optical pickup 1, the detected information is converted into an electric signal according to an amount of received light, and the electric signal is supplied to the matrix circuit 4. The matrix circuit 4 includes a current voltage conversion circuit for an output current from a plurality of reception elements as the photodetector, a matrix computation/amplification circuit, or the like, and generates a necessary signal using matrix computation processing. That is, the matrix circuit 4 generates an RF signal (hereinafter, referred to as recovery signal RF) corresponding to an read-out signal (recovery signal) from the optical disc 50, a focus error signal FE for a servo control, a tracking error signal TE, and the like. The matrix circuit 4 further generates a signal related to wobbling of a groove, that is, a push-pull signal PP as a signal for detecting the wobbling.

The recovery signal RF output from the matrix circuit 4 is supplied to the data signal processing unit 5. The focus error signal FE and the tracking error signal TE are supplied to the servo circuit 11. The push-pull signal PP is supplied to the wobble signal processing circuit 7.

The data signal processing unit 5 performs feed-forward control processing with regard to the recovery signal RF that will be described later, binarization processing using a partial response maximum likelihood (PRML) decoding method, and the like. In the PRML decoding processing, the recovery signal RF is digitally sampled. In order to obtain a sampled value of sampling timing (original sampling timing) that is a target as the sampled value, the feed-forward control processing is performed. In the data signal processing unit 5, a binary data string $D_D$ is obtained by the binarization processing. The binary data string $D_D$ is supplied to the decoder 6. In addition, an internal configuration of the data signal processing unit 5 will be described later.

The decoder 6 demodulates the binary data string $D_D$ that is obtained by the data signal processing unit 5. That is, the decoder 6 performs data demodulation, deinterleaving, ECC decoding, address decoding, or the like. Accordingly, recovery data is obtained from the optical disc 50. Data that is decoded as the recovery data by the decoder 6 is transferred to the host I/F 15, and is transferred to a host apparatus 100 based on an instruction of the system controller 10. Here, the host apparatus 100 is, for example, a computer device, an audio-visual (AV) system apparatus, or the like.

When the optical disc 50 is a recordable type disc, ADIP information processing is performed at the time of recovery. That is, the push-pull signal PP that is output from the matrix circuit 4 as a signal related to wobbling of a groove becomes wobble data that is digitalized in the wobble signal processing circuit 7. In addition, a clock that is synchronized with the push-pull signal is generated by PLL processing. The wobble data is MSK-demodulated and STW-demodulated by the ADIP demodulation circuit 8, the demodulated data is demodulated into a data stream that configures the ADIP address, and the data stream is supplied to the address decoder 9. The address decoder 9 obtains an address value by decoding the data that is supplied, and supplies the address value to the system controller 10.

The servo circuit 11 performs a servo operation of generating various servo drive signals of focus, tracking, and thread, from the focus error signal FE and tracking error signal TE that are output from the matrix circuit 4. That is, the servo circuit 11 generates a focus drive signal and a tracking drive signal, according to the focus error signal FE and the tracking error signal TE, and drives a focus coil and a tracking coil of the two-axis mechanism in the optical pickup 1. Accordingly, a tracking servo loop and a focus servo loop are formed by the optical pickup 1, matrix circuit 4, the servo circuit 11, and the two-axis mechanism. In addition, the servo circuit 11 performs a track jump operation by making the tracking servo loop be off and by outputting a jump drive signal, according to a track jump instruction from the system controller 10.

In addition, the servo circuit 11 provides a focus bias to the focus servo loop, according to the instruction from the system controller 10. In addition, the servo circuit 11 supplies a drive signal for spherical aberration correction to the above-described spherical aberration correction mechanism that is included in the optical pickup 1, according to the instruction from the system controller 10.

In addition, the servo circuit 11 generates a thread drive signal, based on the thread error signal that is obtained as low band components of the tracking error signal TE, an access execution control from the system controller 10, or the like, and drives the thread mechanism 3 using the thread driver 14. The thread mechanism 3 includes a main shaft that retains the optical pickup 1, a thread motor, and a mechanism configured by a transfer gear or the like, that are not illustrated. Slide movement that is demanded by the optical pickup 1 is performed by making the thread driver 14 drive the thread motor according to the thread drive signal.

The spindle servo circuit 12 performs a control of CLV-rotating the spindle motor 2. The spindle servo circuit 12 obtains a clock that is generated by performing PLL processing with respect to a wobble signal, as current rotation speed information of the spindle motor 2, and generates a spindle error signal by comparing the clock with predetermined CLV reference speed information. Then, the spindle servo circuit 12 outputs a spindle drive signal that is generated according to the spindle error signal, and makes a CLV rotation of the spindle motor 2 be performed by the spindle driver 13. In addition, the spindle servo circuit 12 generates the spindle drive signal according to a spindle kick/brake control signal from the system controller 10, and also makes the spindle motor 2 perform operations, such as start, stop, acceleration, or deceleration.

The various operations of the servo system and the recording recovery system that are described above are controlled by the system controller 10 formed by a micro controller. The system controller 10 performs various processing according to a command that is provided via the host I/F 15 from the host apparatus 100. When a read command that requests transfer of certain data to be recorded in the optical disc 50 is supplied from the host apparatus 100, the system controller 10 performs a seek operation control by setting the instructed address as a target. That is, the system controller 10 instructs the servo circuit 11 to perform an operation of accessing the optical pickup 1 by setting the address designated by the read command as a target.

Thereafter, an operation control necessary to transfer data, which is instructed, of a data section to the host apparatus 100 is performed. That is, recovery processing of the data signal processing unit 5 and the decoder 6, with regard to a signal readout operation from the optical disc 50, and the read signal, is performed, and the requested data is transferred.

In addition, in the example of FIG. 1, the recovery device is described as a disc drive device that is coupled to the host apparatus 100, but the recovery device according to the present disclosure may be configured not to be coupled to other apparatuses. In this case, an operation unit or a display unit may be provided, or configurations of data input and output interface portions may be different from those of FIG. 1. That is, recovery may be performed according to an operation of a user, and terminal units for input and output of various data may be formed. Of course, various configurations in addition to this can be considered as the configuration example of the recovery device, and for example, a recordable configuration can also be applicable. That is, an embodiment of a recording recovery device can be applicable as the recovery device according to the present disclosure.

2. Configuration and Operation of Data Signal Processing Unit 5

Figure 2:
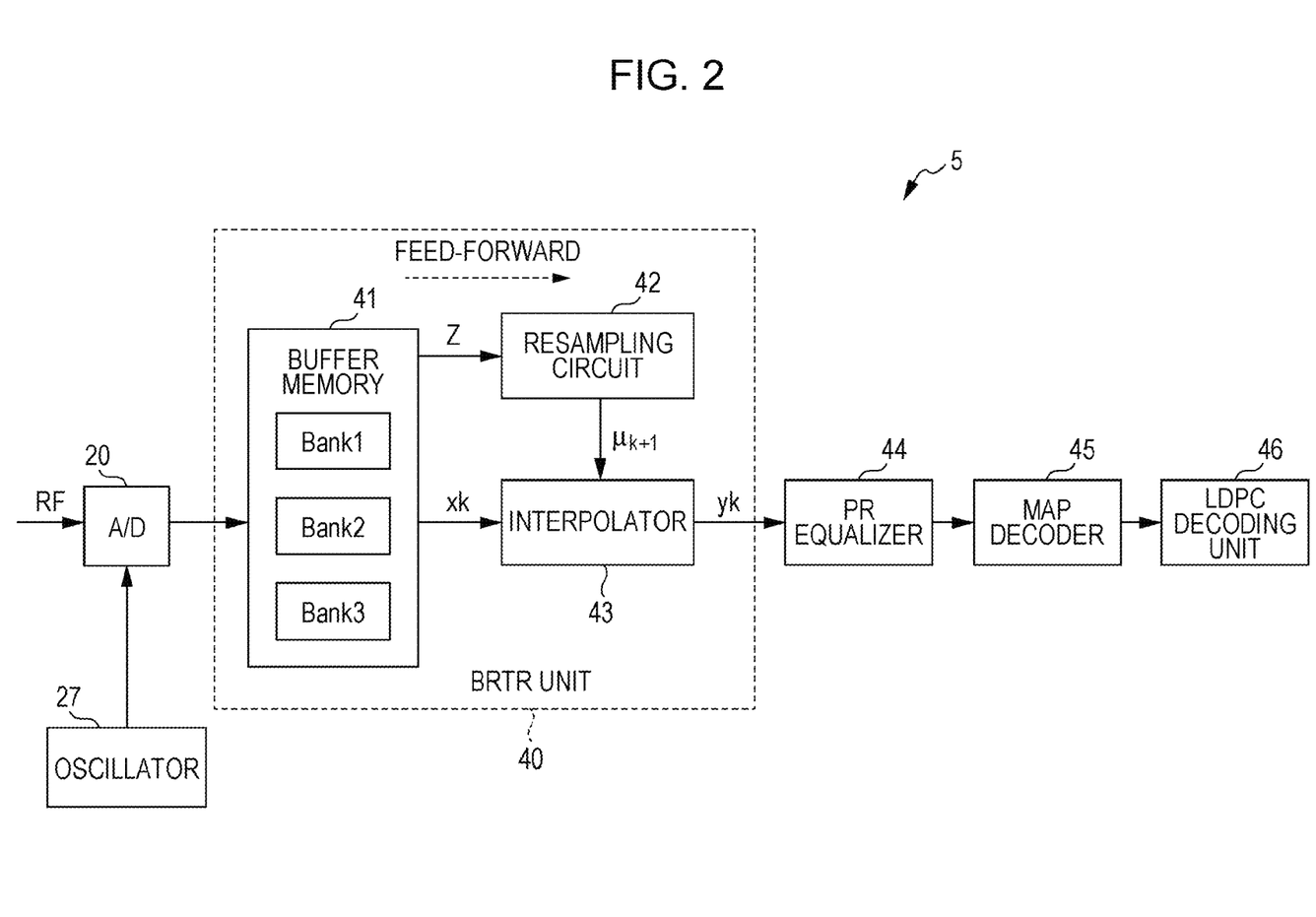
FIG. 2 is a block diagram illustrating a configuration example of a data signal processing unit of the recovery device illustrated in FIG. 1.

FIG. 2 illustrates a configuration example of the data signal processing unit 5. The data signal processing unit 5 performs timing recovery of sampling timing, in such a manner that a sampled value is obtained at sampling timing that is set as a target, by phase interpolation processing according to a feed-forward control, with respect to sampling data which is obtained from the recovery signal RF. Hereinafter, a timing recovery method according to the present embodiment is referred to as buffer re-sampling timing recovery (BRTR).

The data signal processing unit 5 includes an A/D converter 20, an oscillator 27, a BRTR unit 40, a PR equalizer (PR-EQ) 44, a MAP decoder 45, and an LDPC decoding unit 46. The BRTR unit 40 includes a buffer memory 41, a resampling circuit 42, and an interpolator (phase interpolator) 43. The buffer memory 41 includes a plurality of memory banks Bank1 to Bank3.

The A/D converter 20 performs sampling of the recovery signal RF, and outputs the sampling data. The sampling of the A/D converter 20 is performed by a using fixed clock that is output from the oscillator 27. The oscillator 27 generates the fixed clock with a higher frequency than that of an original sync clock of the recovery signal Rf. As a result, as the sampling data, oversampling data with a higher sampling rate than an original data rate of the recovery signal RF is obtained.

The sampling clock of the A/D converter 20 is a higher fixed clock than the original sync clock, and is not synchronized with the original sync clock of the recovery signal RF. For this reason, the sampled value of the recovery signal RF becomes a signal value at timing shifted from the original sync timing, but the BRTR unit 40 performs interpolation generation of a signal value at the original sync timing, and thus as a result, sampling data yk at the original sync timing of the recovery signal RF is obtained.

The sampling data yk from the BRTR unit 40 is equalized at the PR equalizer (PR-EQ) 44, likelihood information is calculated in the MAP decoder 45, and by using the likelihood information, decoding of a low-density parity-check (LDPC) code is performed in the LDPC decoding unit 46. The LDPC code is a linear block code that is defined by a sparse parity check matrix, and it is possible to achieve characteristics close to the Shannon limit, by using iterative decoding called a Sum-Product decoding method.

The buffer memory 41 is a memory unit that temporarily stores the sampling data which is obtained from the recovery signal RF. The resampling circuit 42 detects a phase error between sampling timing of the sampling data stored in the buffer memory 41 and sampling timing (original sampling timing of the recovery signal RF) which is set as a target, and generates a phase control signal $\mu_{k+1}$ of sampling timing, based on the detected phase error.

The interpolator 43 performs phase interpolation processing with respect to sampling data xk that is read out from the buffer memory 41, based on the phase control signal $\mu_{k+1}$, calculates a sampled value at the sampling timing that is set as a target, and outputs by generating the sampling data yk at the original sampling timing.

Figure 9:
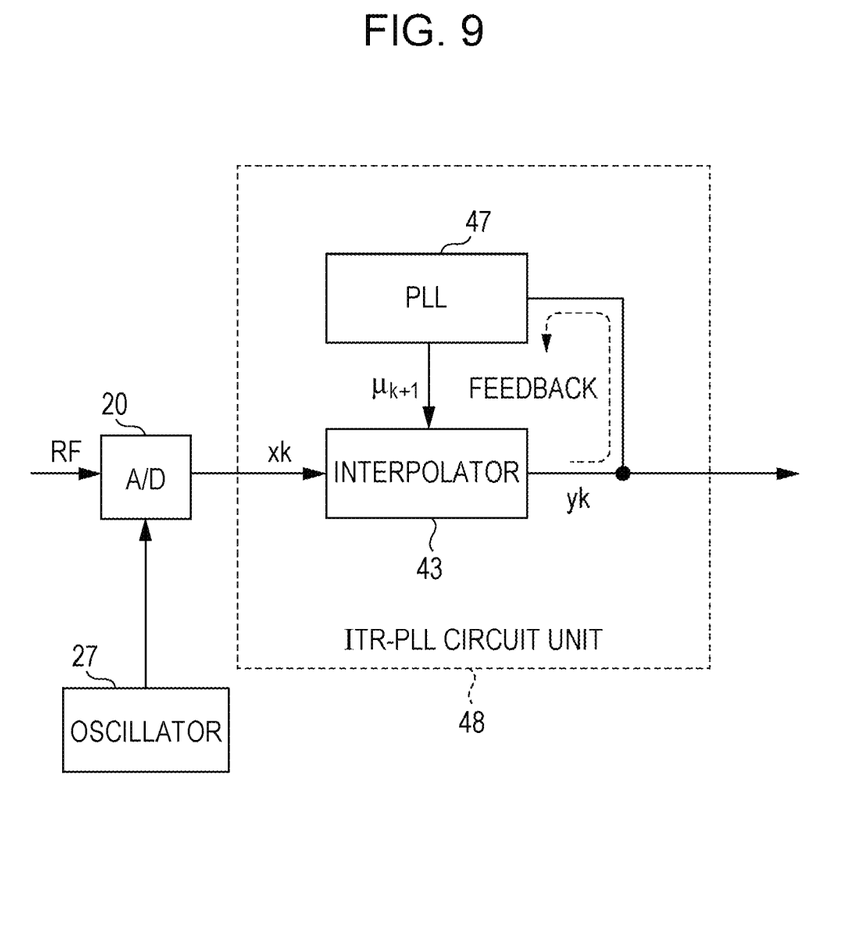
FIG. 9 is a block diagram illustrating a configuration example of a data signal processing unit of a comparative example.
Figure 10:
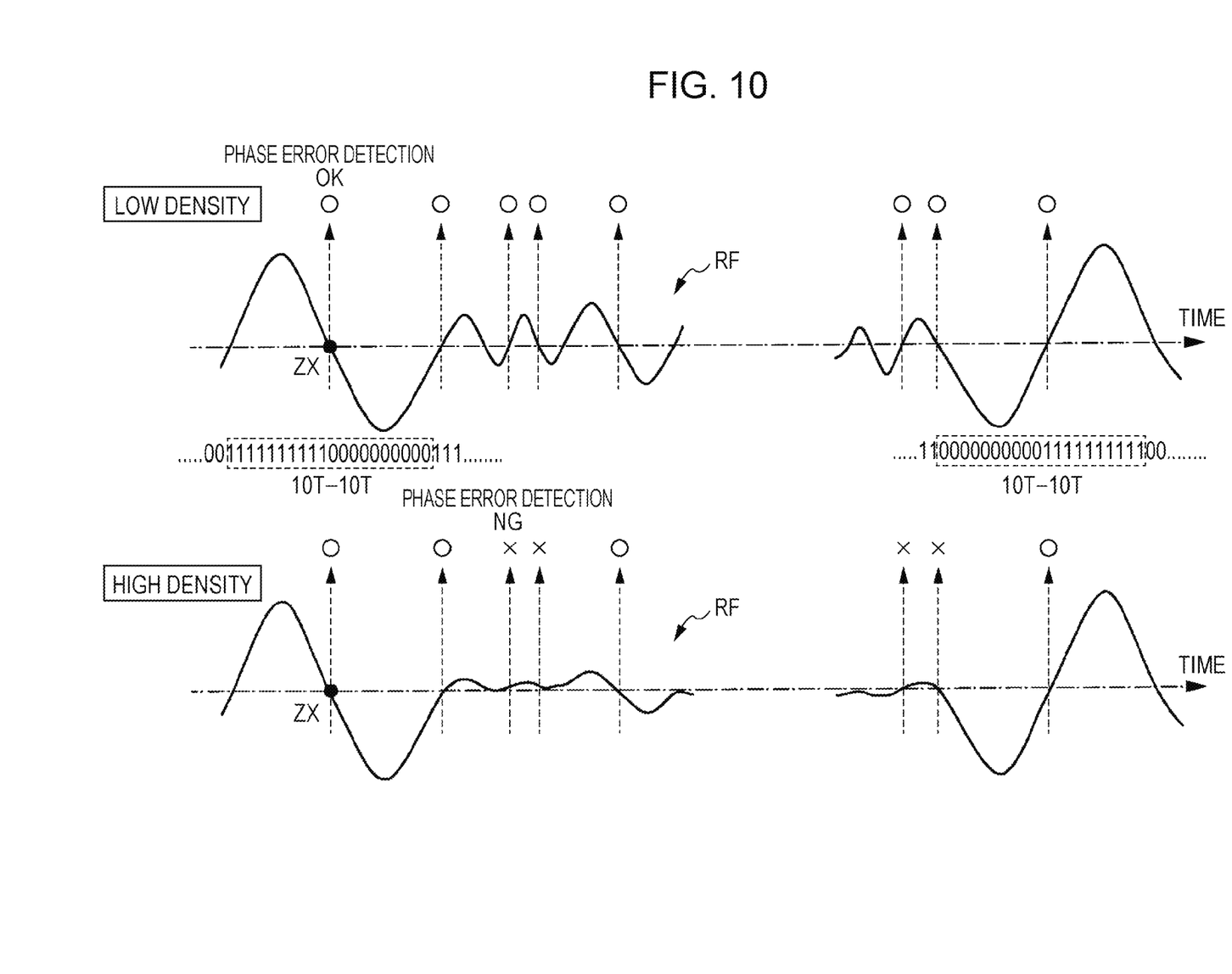
FIG. 10 is an explanatory diagram illustrating an example of a signal waveform of a recovery signal of the comparative example.

Here, FIG. 9 illustrates a circuit of a comparative example with respect to the BRTR unit 40. In addition, FIG. 10 illustrates an example of a signal waveform of the recovery signal RF that is input to the circuit of the comparative example. In FIG. 10, an upper stage illustrates a case where the recovery signal RF is from a recording medium with low density, and a lower stage illustrates a case where the recovery signal RF is from a recording medium with high density.

The circuit of the comparative example illustrated in FIG. 9 includes an ITR-PLL circuit unit 48 instead of the BRTR unit 40. The ITR-PLL circuit unit 48 performs phase interpolation processing according to a feedback loop control using the PLL circuit 47. The ITR-PLL circuit unit 48 uses a zero cross (ZX) point for detecting of the phase error. When the recovery signal RF has low density, the circuit of the comparative example can correctly detect the ZX point, but when the recovery signal RF has high density, the circuit of the comparative example may not correctly detect the ZX point because inter symbol interference (ISI) is great. When the recovery signal RF has high density, since the waveform is not sufficiently zero-crossed at a portion where a pattern of the signal waveform is short, it is difficult to detect the phase error.

Thus, in the present embodiment, a predetermined pattern signal, a waveform of which is known, is embedded in advance in the recovery signal RF, and the resampling circuit 42 detects the phase error, based on the predetermined pattern signal. Then, timing recovery of sampling timing is performed by performing the phase interpolation processing according to the feed-forward control based on a result of the phase error detection.

Figure 3:
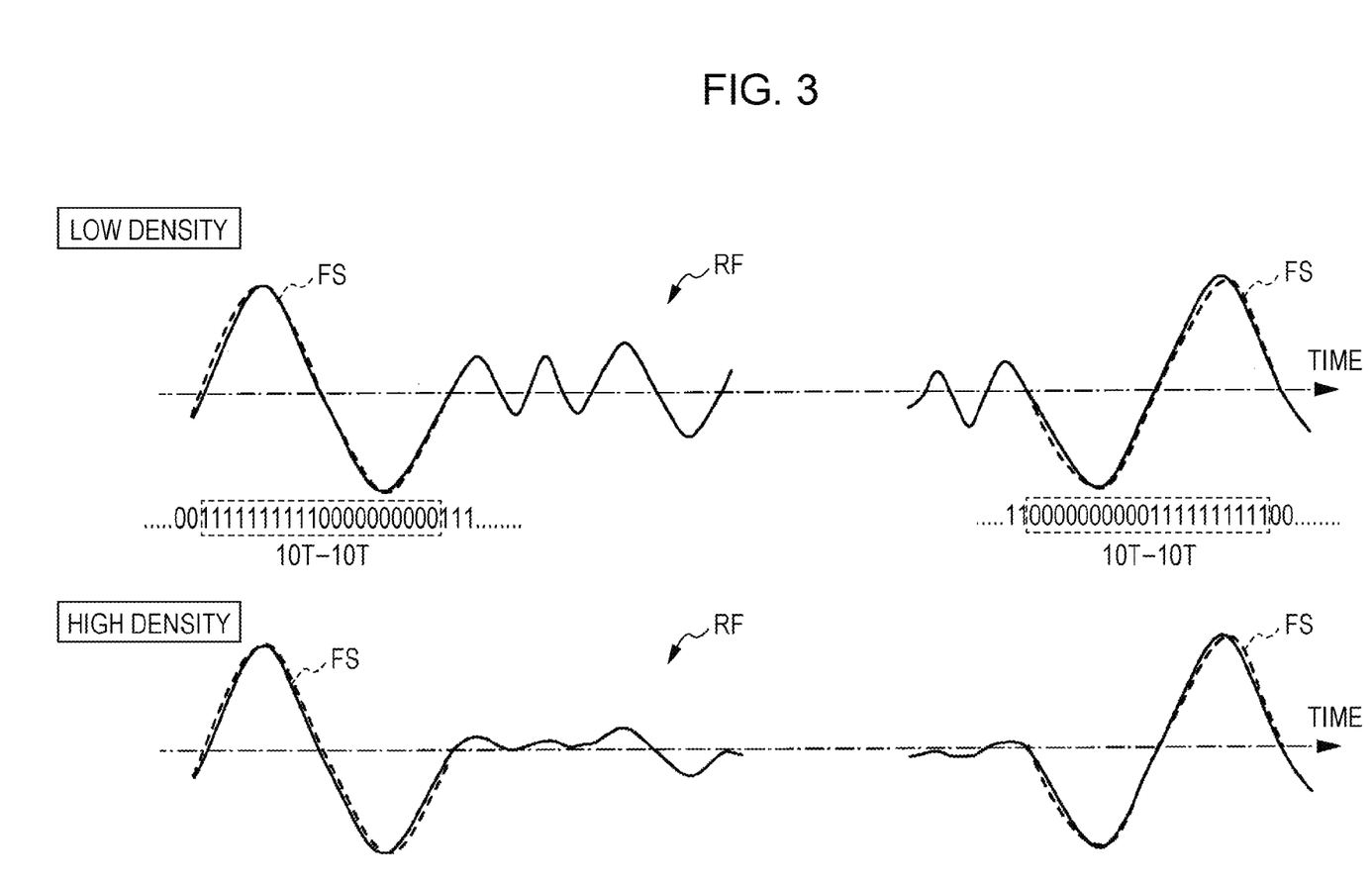
FIG. 3 is an explanatory diagram illustrating an example of a signal waveform of a recovery signal.
Figure 4:
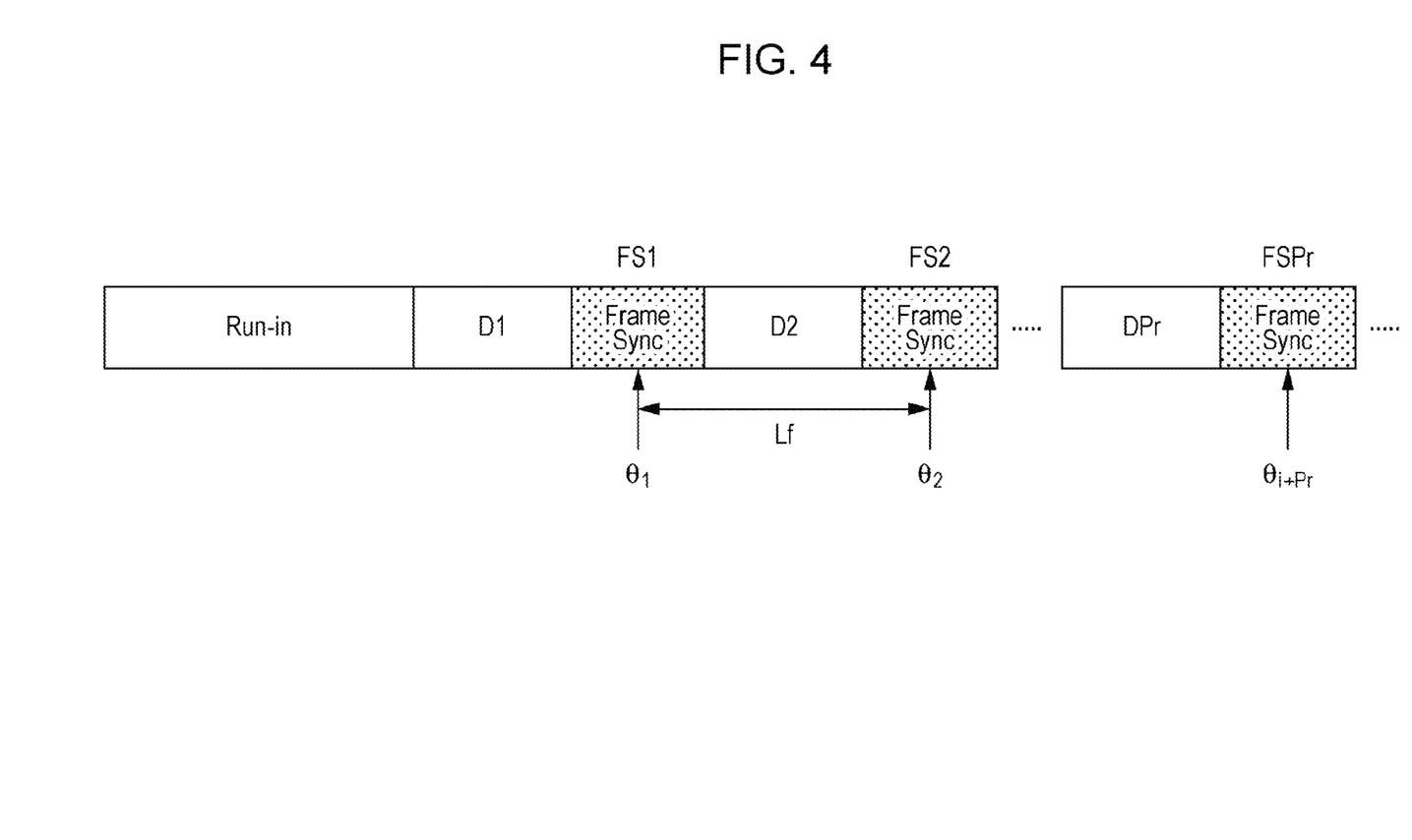
FIG. 4 is an explanatory diagram illustrating an example of a data structure of the recovery signal.
Figure 5:
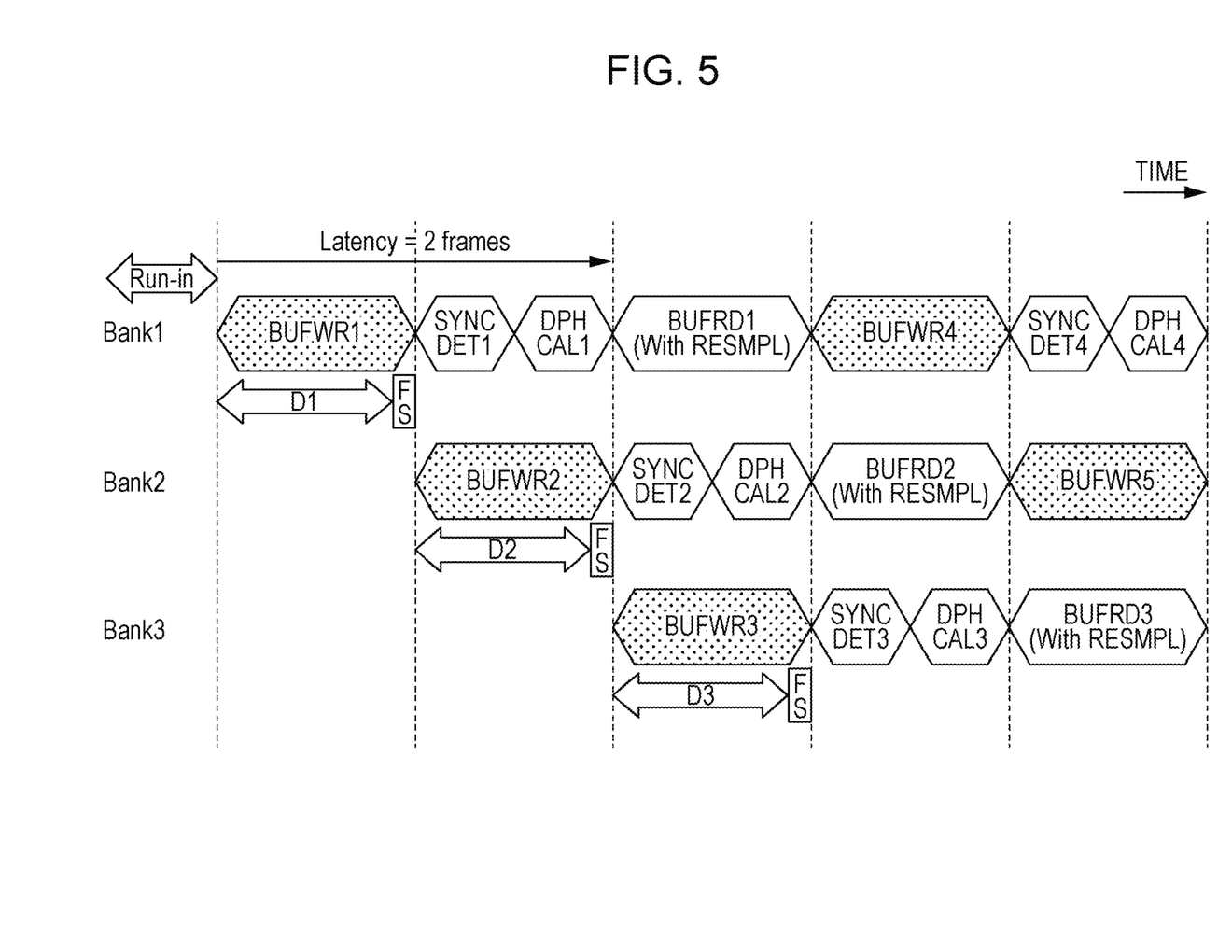
FIG. 5 is an explanatory diagram illustrating an example of a memory sequence of a buffer memory.

Hereinafter, by further referring to FIG. 3 to FIG. 6, a specific example of the phase interpolation processing according to the feed-forward control according to the present embodiment will be described. In addition, FIG. 3 illustrates an example of the signal waveform of the recovery signal RF that is input to the data signal processing unit 5. In FIG. 3, an upper stage illustrates a case where the recovery signal RF is from a recording medium with low density, and a lower stage illustrates a case where the recovery signal RF is from a recording medium with high density. FIG. 4 illustrates an example of a data structure of the recovery signal RF that is input to the data signal processing unit 5. FIG. 5 illustrates an example of a memory sequence of the buffer memory 41. FIG. 6 illustrates an example of a correspondence relationship between the recovery signal RF and the memory sequence of the buffer memory 41.

As the predetermined pattern signal described above, a frame sync signal FS that is added to an actual data signal for each predetermined frame period can be used. In FIGS. 4 and 5, D1, D2 . . . denote actual data signals. In addition, as an example of the frame sync signal FS, FIG. 3 illustrates T pattern data of 10T-10T in which a signal value 0 and a signal value 1 are respectively consecutive 10 times. In this way, if a predetermined pattern signal with a long period, such as the frame sync signal FS is embedded as a known pattern for each period, a sufficient signal output value is obtained even in a case where the recovery signal RF is from a recording medium with high density, and by dividing the phase error detection result according to the known pattern at the sampling period (the number of fixed clocks), it is possible to obtain a phase error of each piece of sampling data.

The sampling data of one frame (SyncFrame interval) is stored in the buffer memory 41, and the sampling data is resampled at a correct timing by the interpolator 43, based on the phase error detection result that will be described hereinafter.

Computations represented in the following Equations (1) and (2) are performed by the resampling circuit 42. Here, Equation (1) represents a phase error ($\Delta\epsilon/\epsilon$) per one clock.

$$\Delta\epsilon/\epsilon = (\theta_{i+Pr} - \theta_i)/(Pr \cdot L_f) \quad (1)$$

Provided that, the symbols in Equation (1) are defined as follows.
  i: FS number (maximum value Nf)
  $\theta_i$: phase
  Pr: resampling FS interval
  $L_f$: sample length between FS
  K: sample number (after resampling)
  $\epsilon$: oversampling rate Equation (2) represents a phase control signal $\mu_{k+1}$ of the sampling timing. A sampling phase $\mu_k$ based on the phase error is updated by Equation (2).

$$\mu_{k+1} = \mu_k + \epsilon \cdot (1 + \Delta\epsilon/\epsilon) \quad (2)$$

Based on the phase control signal $\mu_{k+1}$, the interpolator 43 performs phase interpolation processing according to the following Equation (3), with respect to the sampling data xk that is read out from the buffer memory 41. As a result, the sampling data yk of the original sampling timing is generated and output.

$$y_k = \sum_{j=-M}^{M} x_{k-j} \cdot \mathrm{sinc}[\pi \cdot (j + \mu_k)] \quad \text{Equation (3)}$$

The detection of the phase error performed by the above-described resampling circuit 42 is performed using a maximum likelihood estimation (MLE) method according to the following Equation (4), based on the frame sync signal FS as a predetermined pattern signal.

$$Z^T \cdot \frac{\partial s(\theta)}{\partial \theta}\bigg|_{\hat{\theta}_{MLE}} = 0 \quad \text{Equation (4)}$$

In Equation (4), Z denotes a discrete reception sequence. $s(\theta)$ denotes a reception ideal signal. The discrete reception sequence Z is a vector (observation target vector) in which an observation target waveform is sampled for each time interval and the obtained samples are lined up. In addition, a character T that is marked on the upper right of the vector symbol Z denotes transposition of a vector. $s(\theta)$ corresponds to a known pattern signal waveform. $\hat{\theta}_{MLE}$ denotes a maximum likelihood phase estimation result. In addition, a symbol that is obtained by attaching "^" over $\theta$ is denoted by "$\hat{\theta}$", for convenience.

The maximum likelihood phase estimation is to find the parameter $\hat{\theta}_{MLE}$ that provides the reference signal vector $s(\theta)$ having a smallest Euclid distance between the observation target vectors Z. Thus, it is possible to obtain a conditional equation (Equation (4)) that provides the maximum likelihood phase estimation result, by differentiating an inner product of $Z^T$ and $s(\theta)$ with respect to the phase $\theta$, and by setting the result to zero in the maximum likelihood phase estimation result $\hat{\theta}_{MLE}$. That is, when an inner product of a differentiation signal vector that is prepared in advance and the observation target vector becomes zero, the phase of the differentiation signal vector is a discrete type maximum likelihood estimation result $\hat{\theta}_{MLE}$ of the phase of the observation target vector. The phase $\theta$ that satisfies Equation (4) can be realized by combining an inner product computation unit and a feedback loop, and the combination forms a type of a phase locked loop (PLL). This is called the discrete type maximum likelihood phase estimator. In Equation (4), when an ideal signal is a trigonometric function, the ideal signal corresponds to an integral value of an orthogonal computation and thus the same calculation as that of Wobble address detection may be performed.

When a differentiation function of an original waveform function is known, the function may be multiplied by the PLL so as to make the inner product become zero. That is, when it is assumed that the T pattern data of 10T-10T is the same as illustrated in FIG. 3, the read-out waveform is as follows.

$$Z[k]=\sin(2\pi k/(2\cdot 10))$$

Provided that, k is an integer value denoting time.

The phase error θ can be obtained by the following equation.

$$\theta=\Sigma Z[j]*\{\cos(2\pi j/(2\cdot 10))\}(0 \leq j<20)$$

Since the detection processing of the phase error and the phase interpolation processing that are described above are seamlessly performed in each frame, the buffer managements illustrated in FIG. 5 and FIG. 6 are performed. Data of a first frame is stored in the first memory bank Bank1, data of a second frame subsequent to the first frame is stored in the second memory bank Bank2, data of a third frame subsequent to the second frame is stored in the third memory bank Bank3, and data of a fourth frame subsequent to the third frame is stored in the first memory bank Bank1. At this time, after first sampling data is stored in the first memory bank Bank1, while second sampling data is stored in the second memory bank Bank2, the frame sync signal FS of the first sampling data is detected, and the detection processing of the phase error related to the first sampling data is performed. Next, after second sampling data is stored in the second memory bank Bank2, while third sampling data is stored in the third memory bank Bank3, the phase interpolation processing related to the first sampling data is performed. As described above, while three memory banks are used, seamless timing recovery is performed.

In addition, in FIG. 5, BUFWR denotes a writing period of data to the buffer memory 41. SYNCDET denotes a processing period during which the frame sync signal FS is detected in the resampling circuit 42. DPHCAL denotes a processing period during which the phase error is detected in the resampling circuit 42, based on the detected frame sync signal FS. BUFRD denotes a processing period during which the sampling data is read out from the buffer memory 41 and the phase interpolation processing is performed in the interpolator 43 based on the detected result of the phase error.

3. Experimental Results

FIGS. 7 and 8 illustrate experimental results obtained by performing the timing recovery with respect to the recovery waveform RF that is obtained by performing recording recovery of the BD of which the recording density is from 35 GB to 60 GB, using a data signal processing method according to the present embodiment.

In FIG. 7, a horizontal axis denotes recording line density, and a vertical axis denotes jitter. As a comparative example, when the timing recovery is performed using the PLL method, a value of the jitter is approximately 11% at 50 GB of BD-XL (33.3 GB). Using the data signal processing method according to the present embodiment, the same jitter timing recovery as that of the PLL method can be performed. It is found that a stable jitter is measured even at 60 GB, and the timing recovery can be performed. Since the BD is collapsed at approximately 46 GB in the PLL method of the comparative example, it can be seen that the data signal processing method according to the present embodiment is useful in high density. In addition, in FIG. 7, the jitter is plotted, even when the data recording and read-out surface as tangential tilt performance is tilted at approximately 0.3° and 0.6°, but it is found that, compared to the PLL method of the comparative example, the data signal processing method is a robust method with respect to stress because of substantial overlap. In addition, the tangential tilt means a tilted angle with respect to recording and read-out directions of the data.

In FIG. 8, a horizontal axis denotes recording line density, and a vertical axis denotes a bit error rate bER. FIG. 8 illustrates a bit error rate of data after the LDPC code is decoded by the LDPC decoding unit 46 in FIG. 2, and a bit error rate of the data (RAW) before decoding of the LDPC code is performed. It is found from the experimental results of FIG. 8 (bit slip does not occur) that the code and the data are error-free to approximately 56 GB.

4. Effects

As described above, according to the present embodiment, the phase interpolation processing is performed by the feed-forward control, with respect to the sampling data of the recovery signal RF, and thereby the timing recovery of the sampling timing is performed. Thus, it is possible to increase accuracy of the timing recovery with respect to the sampling data.

In addition, according to the present embodiment, the feedback loop performed by the PLL circuit is not used, and thus it is possible to design stable hardware. According to the present embodiment, the feed-forward control is performed, and thus it is not necessary to consider a phase margin caused by a loop delay of the feedback control. Since the correct phase error detection is performed, it is possible to use a method with a long computation delay.

In addition, the effects described in the present specification are just exemplifiable, and are not limited. Other effects may be applicable.

5. Other Embodiments

The technology according to the present disclosure is not limited to the above-described embodiments, and various modifications can be made.

For example, the present technology can be applicable to a device which recovers a magnetic disc. In addition, the present technology can also be applicable to a case or the like where sampling processing of data that is recovered via a communication path formed by a wire or wirelessly is performed.

In addition, for example, the present technology can adopt the following configurations.

(1)

A data processing device including: a signal processing unit that performs timing recovery of sampling timing, in such a manner that a sampled value is obtained at sampling timing which is set as a target by phase interpolation processing according to a feed-forward control, with respect to sampling data which is obtained from a recovery signal.

(2)

The data processing device described in (1), in which the signal processing unit includes a memory unit that temporarily stores the sampling data which is obtained from the recovery signal; a sampling circuit that detects a phase error between sampling timing of the sampling data which is stored in the memory unit and the sampling timing which is set as the target, and generates a phase control signal of the sampling timing based on the detected phase error; and a phase interpolator that performs phase interpolation processing with respect to the sampling data which is read out from the memory unit, based on the phase control signal and calculates the sampling data at the sampling timing which is set as the target.

(3)

The data processing device described in (2), in which the recovery signal includes a predetermined pattern signal, a waveform pattern of which is known, and the sampling circuit detects the phase error, based on the predetermined pattern signal.

(4)

The data processing device described in (2) or (3), in which the memory unit includes a first memory bank to a third memory bank that respectively and sequentially store the sampling data of a predetermined unit, the memory unit stores first sampling data in the first memory bank, and thereafter, performs detection processing of a phase error related to the first sampling data, while second sampling data is stored in the second memory bank, and the memory unit stores the second sampling data in the second memory bank, and thereafter, performs phase interpolation processing related to the first sampling data, while third sampling data is stored in the third memory bank.

(5)

The data processing device described in (3) or (4), in which the sampling circuit performs detection of the phase error using a maximum likelihood estimation method, based on the predetermined pattern signal.

(6)

The data processing device described in any one of (3) to (5), in which the predetermined pattern signal is a frame sync signal that is attached to an actual data signal for each predetermined frame period.

(7)

The data processing device described in any one of (1) to (6), in which the sampling data is oversampling data according to a fixed sampling rate higher than an original data rate of the recovery signal.

(8)

A data processing method including: performing timing recovery of sampling timing, in such a manner that a sampled value is obtained at sampling timing which is set as a target by phase interpolation processing according to a feed-forward control, with respect to sampling data which is obtained from a recovery signal.

(9)

A recovery device including: a signal generation unit that reads out a signal which is recorded in a recording medium and generates a recovery signal; and a signal processing unit that performs timing recovery of sampling timing, in such a manner that a sampled value is obtained at sampling timing which is set as a target by phase interpolation processing according to a feed-forward control, with respect to sampling data which is obtained from the recovery signal.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing device comprising:
a signal processing unit that performs timing recovery of sampling timing, in such a manner that a sampled value is obtained at sampling timing which is set as a target by phase interpolation processing according to a feed-forward control, with respect to sampling data which is obtained from a recovery signal, wherein the feed-forward control is performed without feedback from an output of the phase interpolation processing, wherein the signal processing unit includes a memory unit that temporarily stores the sampling data which is obtained from the recovery signal;

a sampling circuit that detects a phase error between sampling timing of the sampling data which is stored in the memory unit and the sampling timing which is set as the target, and generates a phase control signal based on the detected phase error; and a phase interpolator that performs phase interpolation processing with respect to the sampling data which is read out from the memory unit, based on the phase control signal and calculates the sampling data at the sampling timing which is set as the target, wherein the memory unit includes a first memory bank to a third memory bank that respectively and sequentially store the sampling data, wherein the memory unit stores first sampling data in the first memory bank, and thereafter, detection processing of a phase error related to the first sampling data is performed, while second sampling data is stored in the second memory bank, and wherein the memory unit stores the second sampling data in the second memory bank, and thereafter, phase interpolation processing related to the first sampling data is performed, while third sampling data is stored in the third memory bank.

2. The data processing device according to claim 1, wherein the recovery signal includes a predetermined pattern signal, a waveform pattern of which is known, and wherein the sampling circuit detects the phase error, based on the predetermined pattern signal.

3. The data processing device according to claim 2, wherein the sampling circuit performs detection of the phase error using a maximum likelihood estimation method, based on the predetermined pattern signal.

4. The data processing device according to claim 2, wherein the predetermined pattern signal is a frame sync signal that is attached to an actual data signal for each predetermined frame period.

5. The data processing device according to claim 1, wherein the sampling data is oversampling data according to a fixed sampling rate higher than an original data rate of the recovery signal.

6. A data processing method comprising:
performing timing recovery of sampling timing, in such a manner that a sampled value is obtained at sampling timing which is set as a target by phase interpolation processing according to a feed-forward control, with respect to sampling data which is obtained from a recovery signal, wherein the feed-forward control is performed without feedback from an output of the phase interpolation processing, wherein performing timing recovery of sampling timing includes temporarily storing the sampling data which is obtained from the recovery signal in a memory unit;

detecting a phase error between sampling timing of the sampling data which is stored in the memory unit and the sampling timing which is set as the target, and generating a phase control signal based on the detected error signal; and performing phase interpolation processing with respect to the sampling data which is read out from the memory unit, based on the phase control signal and calculating the sampling data at the sampling timing which is set as the target, wherein the memory unit includes a first memory bank to a third memory bank that respectively and sequentially store the sampling data, wherein the memory unit stores first sampling data in the first memory bank, and thereafter, detection processing of a phase error related to the first sampling data is performed, while second sampling data is stored in the second memory bank, and wherein the memory unit stores the second sampling data in the second memory bank, and thereafter, phase interpolation processing related to the first sampling data is performed, while third sampling data is stored in the third memory bank.

7. A recovery device comprising:

a signal generation circuit that reads out a signal which is recorded in a recording medium and generates a recovery signal; and a signal processing unit that performs timing recovery of sampling timing, in such a manner that a sampled value is obtained at sampling timing which is set as a target by phase interpolation processing according to a feed-forward control, with respect to sampling data which is obtained from the recovery signal, wherein the feed-forward control is performed without feedback from an output of the phase interpolation processing, wherein the signal processing unit includes a memory unit that temporarily stores the sampling data which is obtained from the recovery signal;

a sampling circuit that detects a phase error between sampling timing of the sampling data which is stored in the memory unit and the sampling timing which is set as the target, and generates a phase control signal based on the detected phase error; and a phase interpolator that performs phase interpolation processing with respect to the sampling data which is read out from the memory unit, based on the phase control signal and calculates the sampling data at the sampling timing which is set as the target, wherein the memory unit includes a first memory bank to a third memory bank that respectively and sequentially store the sampling data, wherein the memory unit stores first sampling data in the first memory bank, and thereafter, detection processing of a phase error related to the first sampling data is performed, while second sampling data is stored in the second memory bank, and wherein the memory unit stores the second sampling data in the second memory bank, and thereafter, phase interpolation processing related to the first sampling data is performed, while third sampling data is stored in the third memory bank.

* * * * *